US 7,022,041 B2

(12) United States Patent
Valente

(10) Patent No.: US 7,022,041 B2
(45) Date of Patent: Apr. 4, 2006

(54) HELICAL GEAR DIFFERENTIAL

(75) Inventor: Paul J. Valente, Berkley, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 50 days.

(21) Appl. No.: 10/794,780

(22) Filed: Mar. 5, 2004

(65) Prior Publication Data

US 2005/0197229 A1 Sep. 8, 2005

(51) Int. Cl.
 *F16H 48/06* (2006.01)
(52) U.S. Cl. ............... 475/252; 475/248; 475/249; 74/606 R; 74/607
(58) Field of Classification Search ............ 475/248, 475/249, 252; 74/606 R, 607
 See application file for complete search history.

(56) References Cited

U.S. PATENT DOCUMENTS

| 2,269,734 | A |   | 1/1942  | Powell           |         |
|-----------|---|---|---------|------------------|---------|
| 3,706,239 | A |   | 12/1972 | Myers            |         |
| 4,365,524 | A |   | 12/1982 | Dissett          |         |
| 4,677,876 | A |   | 7/1987  | Dissett          |         |
| 4,751,853 | A | * | 6/1988  | Dissett ........ | 475/226 |
| 5,055,096 | A |   | 10/1991 | Riemscheid et al.|         |
| 5,122,101 | A |   | 6/1992  | Tseng            |         |
| 5,122,102 | A |   | 6/1992  | Chludek et al.   |         |
| 5,139,467 | A |   | 8/1992  | Carpenter        |         |
| 5,221,238 | A |   | 6/1993  | Bawks et al.     |         |
| 5,292,291 | A |   | 3/1994  | Ostertag         |         |
| 5,342,256 | A |   | 8/1994  | Amborn et al.    |         |
| 5,389,048 | A |   | 2/1995  | Carlson          |         |
| 5,492,510 | A |   | 2/1996  | Bowerman         |         |
| 5,554,081 | A |   | 9/1996  | Bowerman         |         |
| 5,671,640 | A |   | 9/1997  | Valente          |         |
| 5,823,907 | A | * | 10/1998 | Teraoka et al. ..... | 475/248 |
| 5,842,946 | A |   | 12/1998 | Ichiki           |         |
| 5,951,431 | A |   | 9/1999  | Downs et al.     |         |
| 5,983,754 | A |   | 11/1999 | Tyson et al.     |         |
| 5,984,823 | A |   | 11/1999 | Gage             |         |
| 6,053,838 | A |   | 4/2000  | Gage             |         |
| 6,139,462 | A | * | 10/2000 | Gage et al. ...... | 475/248 |
| 6,533,697 | B1|   | 3/2003  | Morse et al.     |         |
| 6,540,640 | B1|   | 4/2003  | Hibbler et al.   |         |
| 2002/0025878 | A1 |   | 2/2002 | Kam              |         |

FOREIGN PATENT DOCUMENTS

| DE | 4023332 A1 | 7/1990 |
| EP | 356401 A2 * | 2/1990 |
| GB | 2212231    | 11/1987 |
| JP | 2000110920 | 4/2000 |

* cited by examiner

*Primary Examiner*—Charles Marmor
*Assistant Examiner*—David D. Le
(74) *Attorney, Agent, or Firm*—Harness, Dickey & Pierce P.L.C.

(57) ABSTRACT

A differential assembly that includes a differential casing, which is rotatable about an axis, and a pair of side gears that are disposed within the differential casing. First, second, third and fourth pairs of pinion bores are formed in the differential casing and pairs of pinion gears are slidably and rotatably disposed in a respective pair of the pinion bores. A window opening is formed in the differential casing between the first and fourth pair of pinion gears. The second pair of pinion bores are radially offset an equivalent distance from the first and third pair of pinion bores. The differential assembly incorporates a cross pin configured to limit inward movement of a pair of axle shafts and a spacer that limits inward movement of the side gears.

8 Claims, 12 Drawing Sheets

HELICAL GEAR DIFFERENTIAL

FIELD OF THE INVENTION

The present invention relates to differentials for use in automotive drivelines and, more particularly, to a pinion pair arrangement for a four pinion pair, C-clip differential having independent control of side gear endplay and axle shaft endplay.

BACKGROUND OF THE INVENTION

Differentials of the type used in automotive drivelines generally include a planetary gearset supported within a differential casing to facilitate relative rotation (i.e., speed differentiation) between a pair of output shafts. The planetary gearset typically includes helical side gears fixed to the end of the output shafts, which are meshed with paired sets of helical pinion gears. This type of differentiation is known as a parallel axis helical gear differential. In response to input torque applied to the differential case, the torque transmitted through meshed engagement of the side gears and pinion gears generates thrust forces. To accommodate these and other operating forces, the wall surface of the gear pockets and other thrust surfaces of the differential casing must provide adequate support.

In some differentials it is necessary to install C-shaped retainers, or C-clips for restraining and positioning the output shafts in the differentials. To install the C-clips it is necessary to gain access to the interior cavity of the differential casing through an access window arranged on the differential casing.

In general, it is desirable to allow the side gear loading to be spread out evenly around the periphery of the differential. One way to achieve even loading is to position the pinion pairs evenly around the periphery of the differential casing. However, because the access window is arranged on the outer periphery of the differential casing, there tends to be incompatibility issues with placement of the pinion pairs.

SUMMARY OF THE INVENTION

A differential assembly for a vehicle includes a differential casing rotatable about an axis. A pair of side gears are disposed within the differential casing. A first, second, third and fourth pair of pinion bores are formed in the differential casing. A first, second, third and fourth pair of pinion gears are slidably and rotatably disposed in the first, second, third and fourth pair of pinion bores respectively. A window opening is formed in the differential casing between the first and fourth pair of pinion gears. The second pair of pinion bores are radially offset an equivalent distance from the first and third pair of pinion bores. The third pair of pinion bores are radially offset an equivalent distance from the second and the fourth pair of pinion bores.

According to other features a spacer is disposed between the pair of side gears in the differential casing. A cross pin extends substantially transverse to the axis and through a passage in the spacer. The cross pin includes a proximal head portion, which is secured to the differential casing proximate to the window opening. An intermediate shank portion passes through the passage in the spacer. A distal end portion is piloted in a bore formed in the differential casing.

A differential assembly for a vehicle includes a differential casing rotatable about an axis and communicating with a first and second axle shaft. A window opening is formed in the differential casing. A pair of side gears are disposed within the differential casing. A spacer is disposed between the pair of side gears and limits inward movement of the side gears, the spacer including a passage therein. A cross pin extends generally transverse to the axis and through the differential casing, the cross pin passing through the passage in the spacer and limiting inward movement of the first and second axle shafts. The cross pin limits inward movement of the first and second axle shafts independently of the spacer limiting inward movement of the side gears.

A method of assembling a first and second side gear within a differential casing includes locating a spacer between the first and second side gear. A cross pin is inserted through the window opening and the spacer passage. The cross pin is adapted to limit axial movement of the axle shafts while remaining clear of contact from the spacer. A distal end portion of the cross pin is located into a bore on the differential casing. The cross pin is secured to the differential casing at the window opening.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses. The differential assembly according to the present teachings may be utilized with a wide variety of applications and is not intended to be specifically limited to the particular application recited herein.

Figure 1:
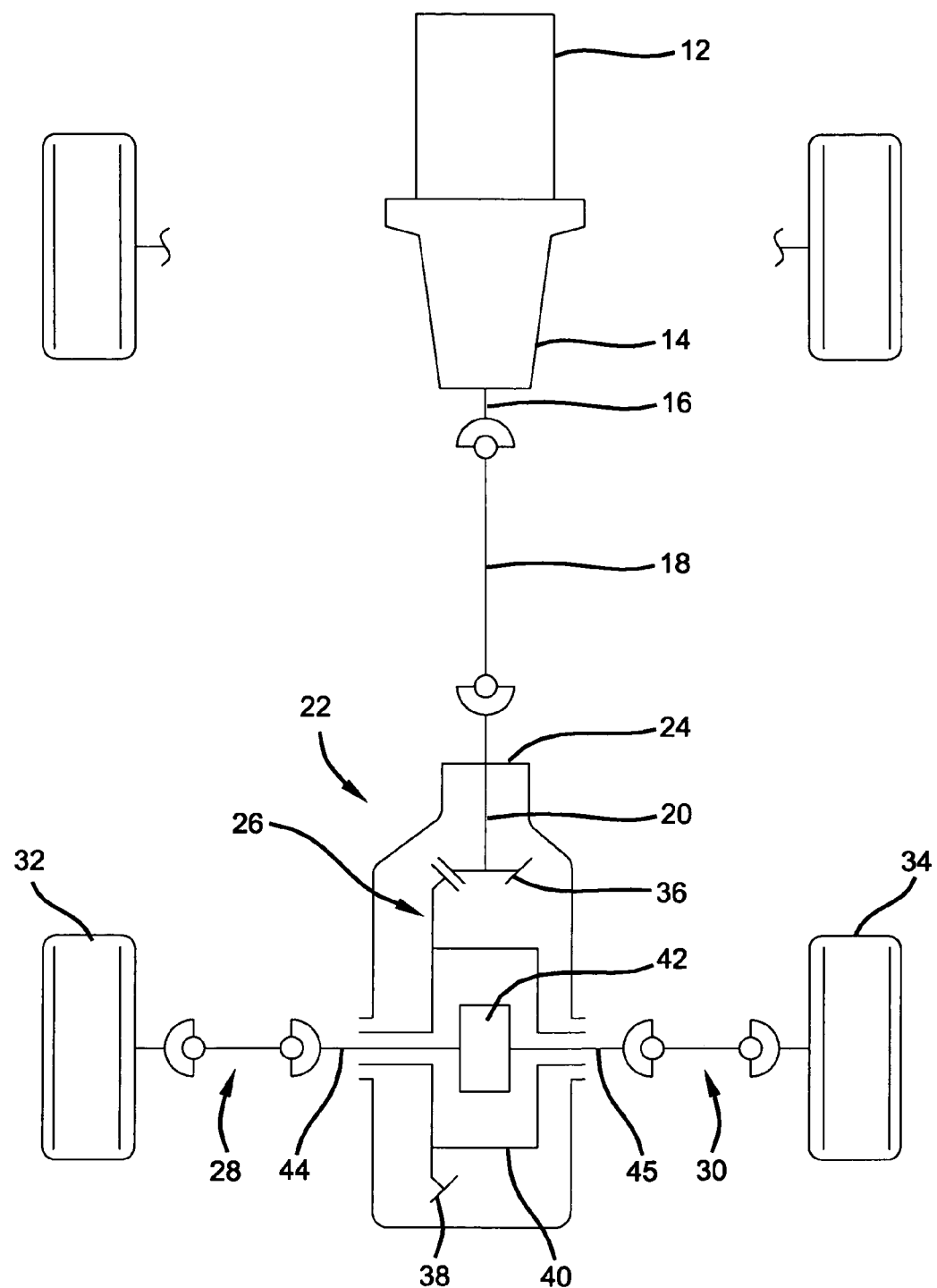
FIG. 1 is a schematic view of an exemplary motor vehicle into which a differential assembly constructed in accordance with the teachings of the present invention is incorporated.

With initial reference to FIG. 1, a drivetrain 10 for an exemplary motor vehicle may include an engine 12, a transmission 14 having an output shaft 16, and a propeller shaft 18 connecting the output shaft 16 to a pinion shaft 20 of a rear axle assembly 22. The rear axle assembly 22 includes an axle housing 24, a differential assembly 26 supported in the axle housing 24, and a pair of axle shafts 28 and 30, respectively, interconnected to a left and right rear wheel 32 and 34, respectively. The pinion shaft 20 has a pinion shaft gear 36 fixed thereto which drives a ring gear 38 that may be fixed to a differential casing 40 of the differential assembly 26. A gearset 42 supported within the differential casing 40 transfers rotary power from the casing 40 to a pair of output shafts 44 and 45 connected to the axle shafts 28 and 30, respectively, and facilitates relative rotation (i.e., differentiation) therebetween. While the differential assembly 26 is shown in a rear-wheel drive application, the present invention is contemplated for use in differential assemblies installed in transaxles for use in front-wheel drive vehicles, and/or in transfer cases for use in four-wheel drive vehicles.

Turning now to FIGS. 2a–4, the differential assembly 26 will be described in further detail. The differential assembly 26 may be a parallel-axis helical-gear type differential and includes the differential casing 40, which defines an internal chamber 48. The differential casing 40 includes a main drum or body 46 and an end cap 50, each of which having respective mating radial flanges 52 and 54, respectively. The radial flanges 52 and 54 are secured together by a plurality of bolts (not shown) extending through aligned mounting bores 58. As is known, a ring or bevel gear can be fixed to the radial flange 52 on the differential casing 40 to transfer rotary power (i.e., drive torque) thereto. The differential casing 40 defines a pair of axially aligned openings 60a and 60b in communication with the internal chamber 48. The axially aligned openings 60a and 60b are adapted to receive the end segments of the pair of driving output shafts 44 and 45 (FIG. 1), hereinafter referred to as axle shafts.

Figure 3:
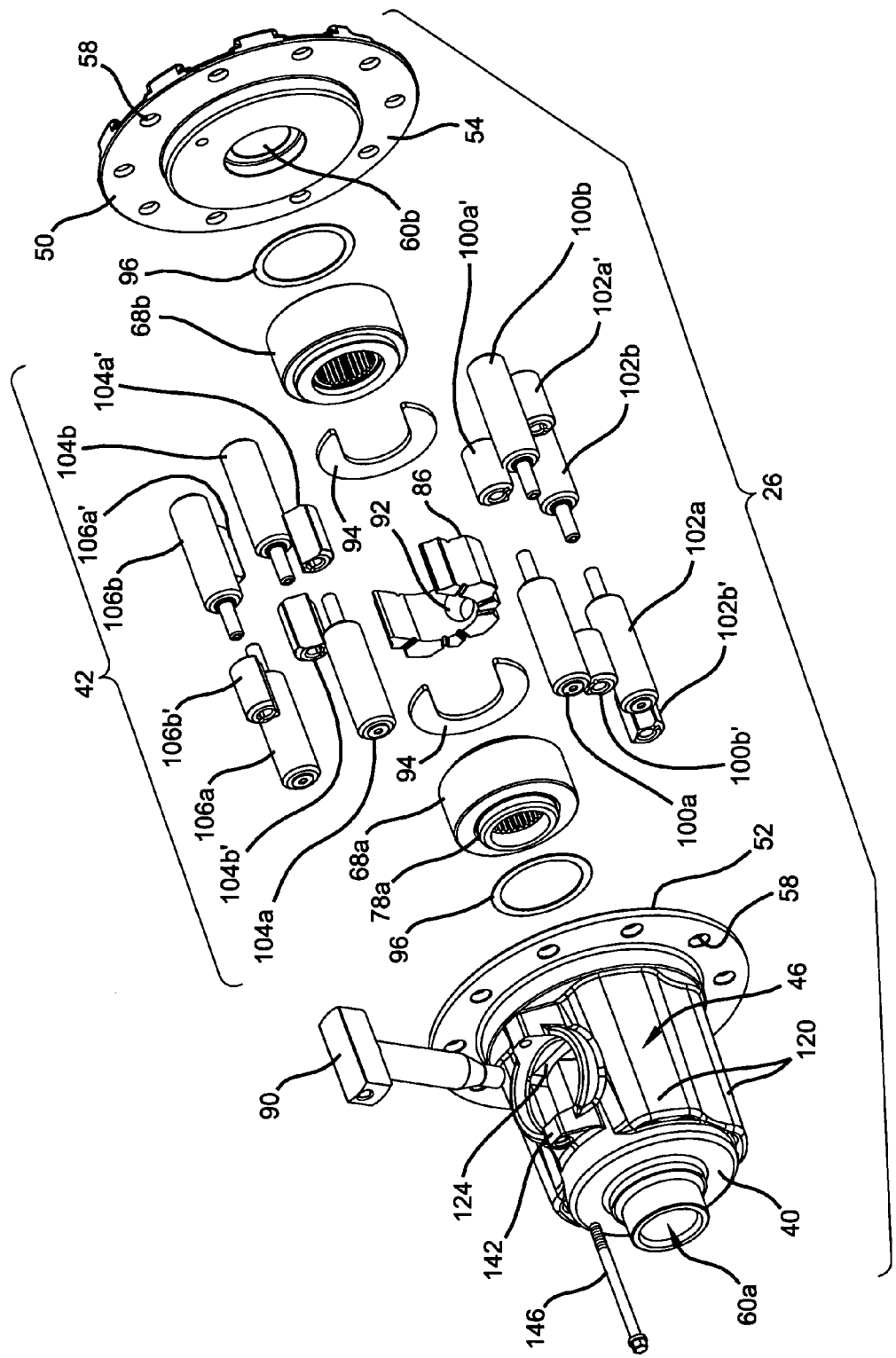
FIG. 3 is an exploded view of the differential assembly of FIG. 1.
Figure 4:
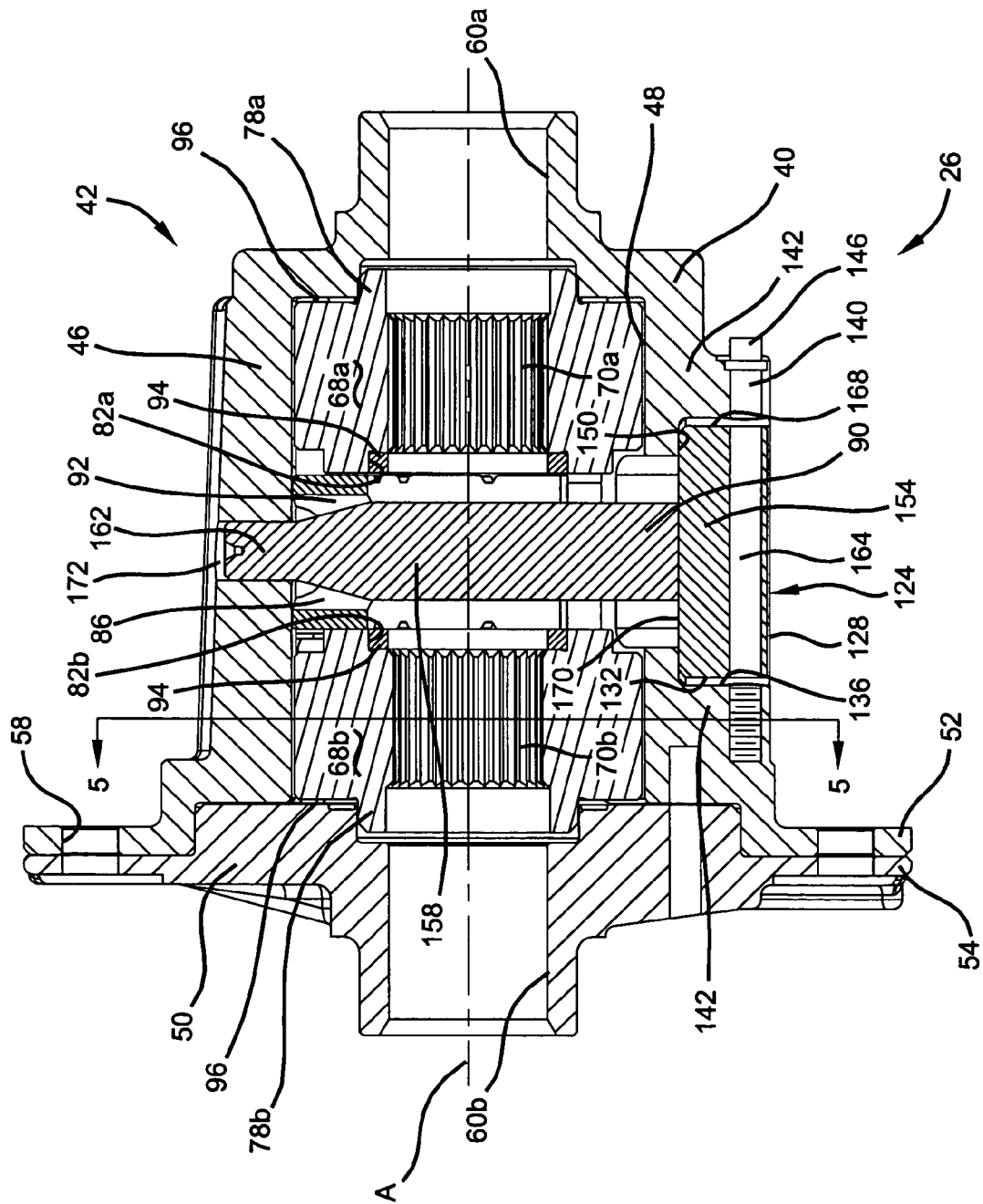
FIG. 4 is a sectional view of the differential assembly taken along line 4—4 of FIG. 2*a;*

With specific reference to FIGS. 3 and 4, the differential assembly 26 includes the gearset 42 that is operable for transferring drive torque from the differential casing 40 to the output shafts 44 and 45 (FIG. 1) in a manner that facilitates speed differential therebetween. Gearset 42 may be a helical-type and may be disposed within the internal chamber 48. The gearset 42 includes a pair of side gears 68a and 68b. The side gears have internal splines 70a and 70b meshed with external splines, not specifically shown, on the corresponding output shafts 44 and 46 (FIG. 1). In addition, the side gears 68a and 68b include axial hubs 78a and 78b, respectively, which are retained in corresponding annular sockets, formed in the main body 46 and the end cap 50 of the differential casing 40, and annular chambers 82a and 82b. As will be described in greater detail below, a spacer 86 may be located between the side gears 68a and 68b for limiting the amount of axial endplay of the side gears 68a and 68b within the differential case 40. A cross pin assembly 90 extends through a clearance passage 92 in the spacer 86 and controls endplay of the axle shafts 44 and 45 (FIG. 1).

C-shaped retainers, or C-clips 94, may be retained in the annular chambers 82a and 82b for preventing the axle shafts 44 and 45, respectively, from becoming disengaged with the side gears 68a and 68b. The side gears 68a and 68b may be bounded at their outer ends by washers 96.

The gearset 42 includes four sets of pinion pairs, 100a and 100b, 102a and 102b, 104a and 104b and 106a and 106b, respectively (FIG. 3). For clarity the pinion pairs 100a and 100b, 102a and 102b, 104a and 104b and 106a and 106b are hereinafter referred to as a first, second, third and fourth pair of pinion gears 100, 102, 104 and 106, respectively. Brake shoes 100a'–106b' cooperate with respective pinion gears 100–106.

Figure 2A:
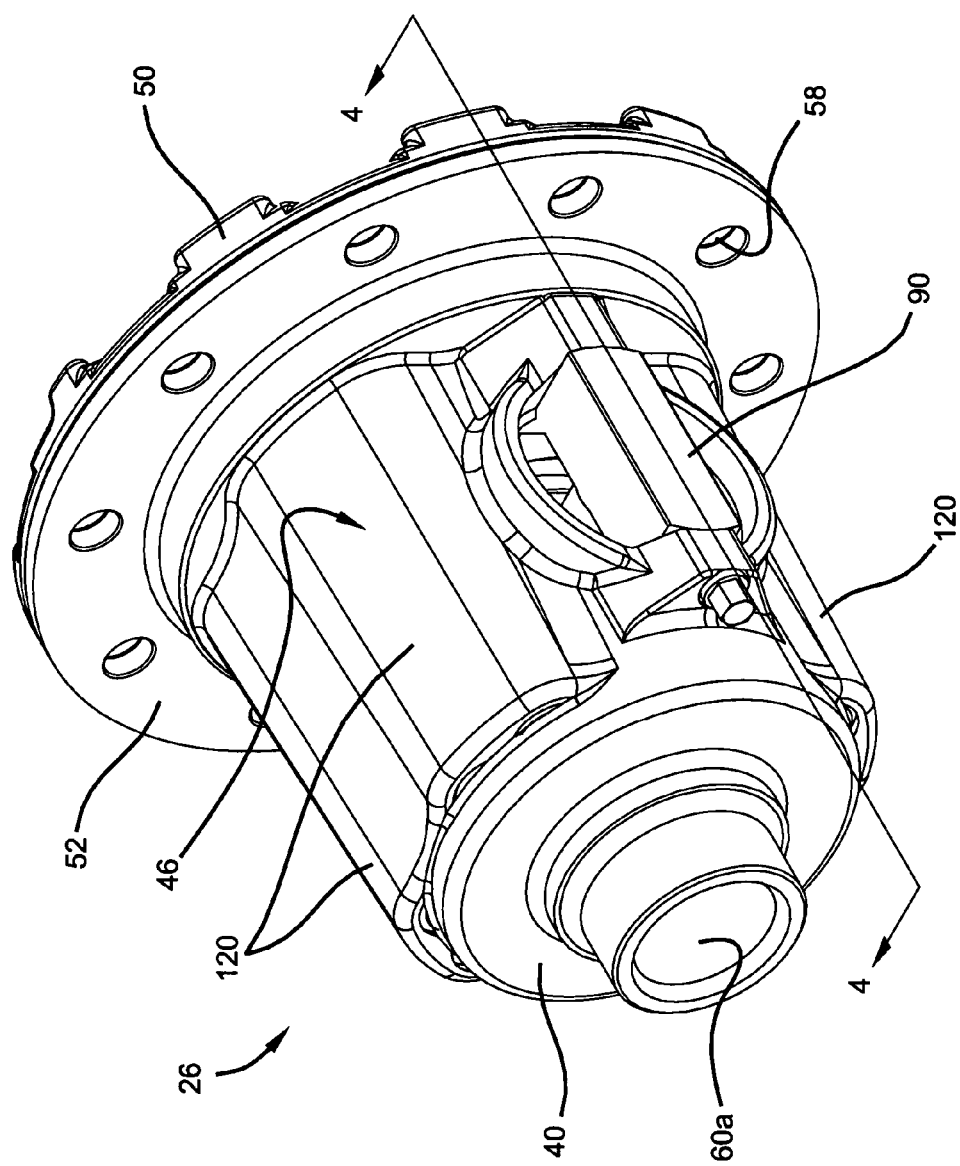
FIG. 2*a* is a perspective view of the differential assembly of FIG. 1.
Figure 2B:
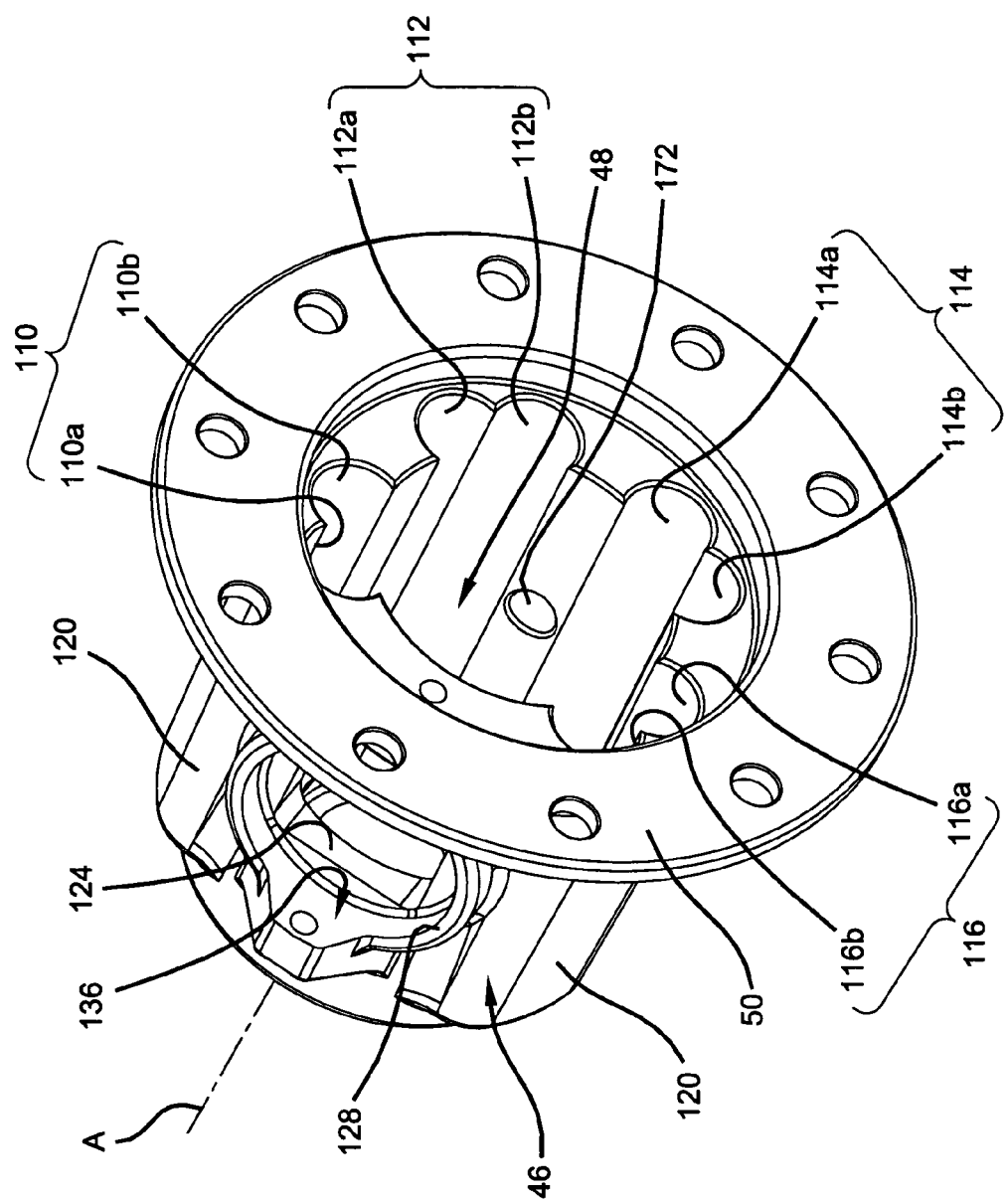
FIG. 2*b* is a perspective view of the differential casing of FIG. 1.

In FIGS. 2b and 3, the four sets of pinion pairs 100–106 are rotatably supported in complementary sets of pinion bores 110a and 110b, 112a and 112b, 114a and 114b, and 116a and 116b. The complementary sets of pinion bores 110a and 110b, 112a and 112b, 114a and 114b, and 116a and 116b are hereinafter referred to as a first, second, third and fourth pair of pinion bores 110, 112, 114, and 116, respectively. The pinion bores 110–116 are formed in raised hub segments 120 of the main body 46. The pinion bores 110–116 are arranged in paired sets such that they communicate with each other and with the internal chamber 48. In addition, the pinion bores 110–116 are aligned substantially parallel to the rotational axis A of the axle shafts 44 and 46 (FIG. 1). A window opening 124 may be arranged on the differential casing 40 between the first and the fourth pair of pinion gears 100 and 106.

Figure 5:
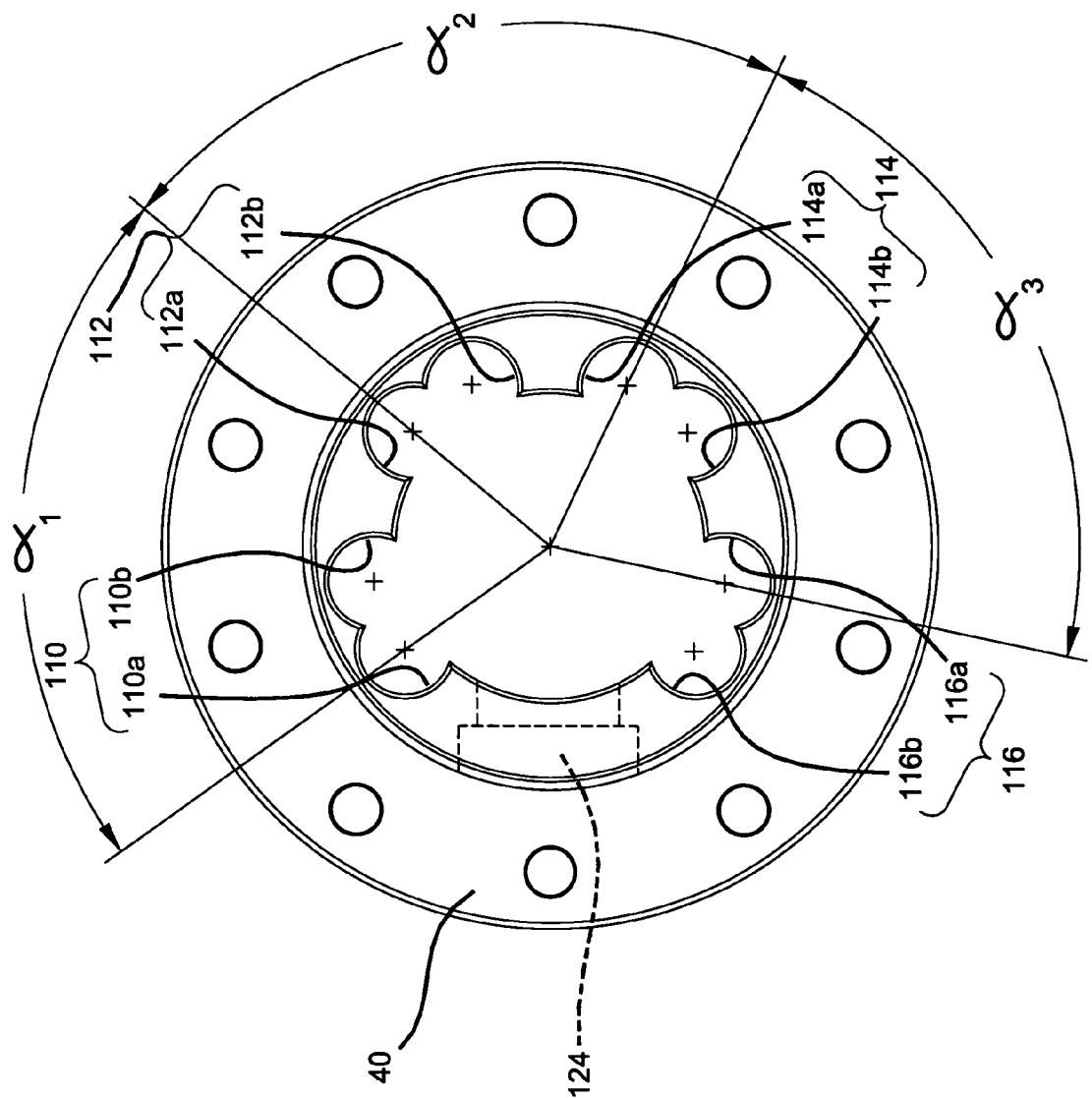
FIG. 5 is a cross-sectional view of the differential assembly taken along line 5—5 of FIG. 4.

With reference now to FIG. 5, the spacial relationship of the pinion pairs will be described. The four pinion bores 110–116, and as a result, the four pinion pairs 100–106 (FIG. 3), are radially spaced evenly around the differential casing 40 opposite the window opening 124. More specifically, the first pair of pinion bores 110 are offset a radial distance $\alpha_1$ from the second pair of pinion bores 112. The second pair of pinion bores 112 are offset a radial distance $\alpha_2$ from the third pair of pinion bores 114. The third pair of pinion bores 114 are offset a radial distance $\alpha_3$ from the fourth pair of pinion bores 116. As illustrated, the respective a distances are taken from the centerline of respective first bores 110a–110d. The radial offsets between the pinion bores 110 and 112, 112 and 114, and 114 and 116 may be approximately equivalent (e.g., $\alpha_1=\alpha_2=\alpha_3$). In the example provided, $\alpha_1$, $\alpha_2$ and $\alpha_3$ are approximately 75 degrees.

Figure 6:
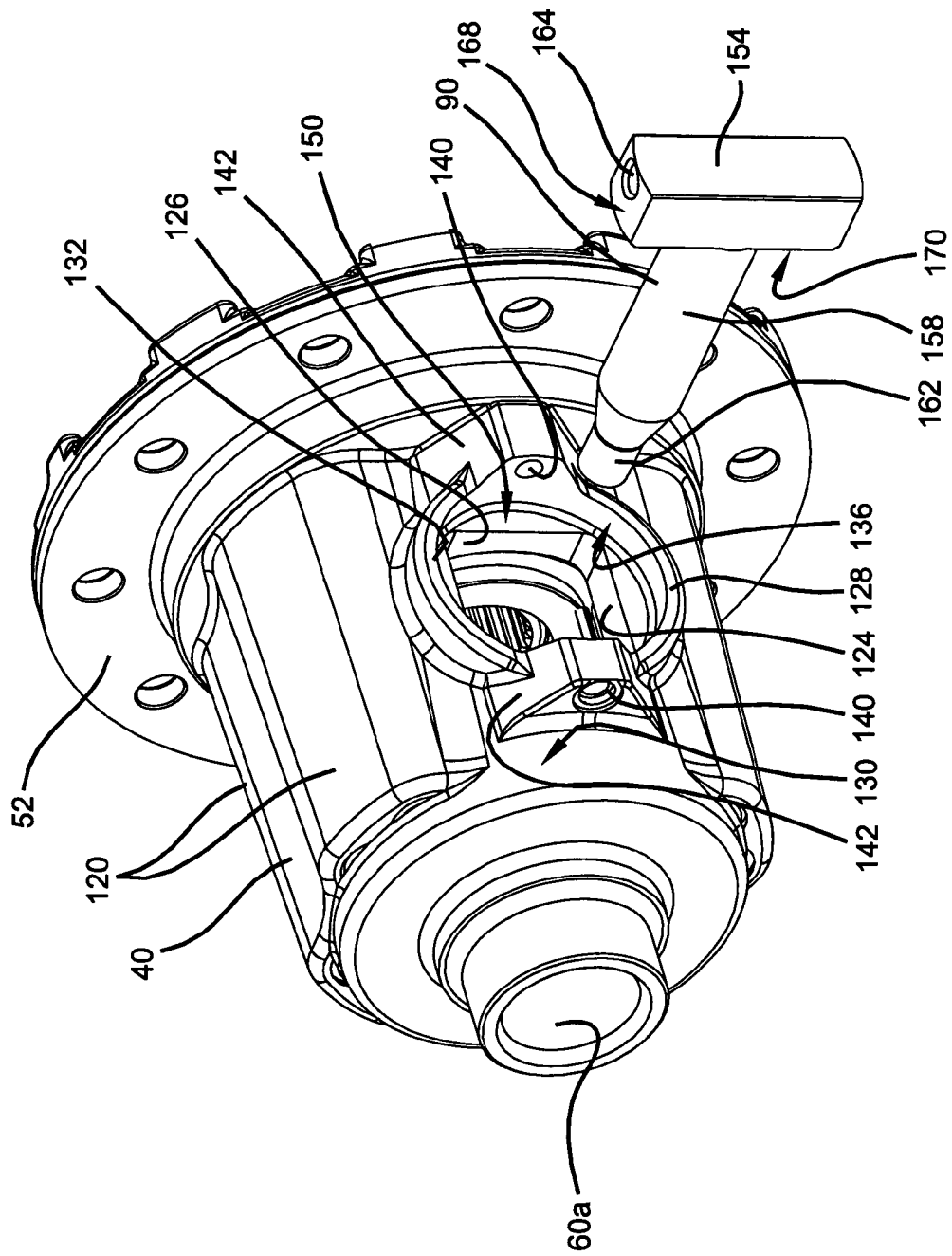
FIG. 6 is a perspective view of the differential assembly of FIG. 1 illustrating the cross pin assembly in an exploded condition.

With specific reference now to FIGS. 2b, 4 and 6, the configuration of the window opening 124 and the cooperation of the cross pin assembly 90 will be described. The window opening 124 includes an access passage 126 surrounded by a cylindrical boss 128 that may be formed on an outer surface 130 of the differential casing 40. The cylindrical boss 128 defines a counterbore 132 having an inner radial engaging surface 136. The cylindrical boss 128 includes a pair of mounting passages 140 formed on raised flanges 142 for receiving a fastener 146 (FIG. 8) therethrough. A ledge portion 150 extends at least partially about the window opening 124 inwardly of the cylindrical boss 128 on the differential casing 40.

The cross pin assembly 90 generally includes a proximal head portion 154, an intermediate shank portion 158 and a distal end portion 162. The head portion 154 defines a body that may extend generally transverse to the longitudinal axis of the cross pin 90. The head portion 154 may include a throughbore 164 for receiving the fastener 146. The head portion 154 may include arcuate ends 168 that may be slidably disposed against the inner radial engaging surface 136 of the counterbore 132 during assembly. A bottom surface 170 of the head portion 154 locates against the ledge 150. The distal end portion 162 of the cross pin assembly 90 locates into a bore 172 formed into incorporated on the differential casing 40.

The cross pin assembly 90 may be unitarily formed or may comprise two or more components. In the example provided, the cross pin 90 is a two-piece assembly comprising the proximal head portion 154, which may be pressed onto a discrete shank that defines both the intermediate shank portion 158 and the distal end portion 162. It is appreciated that while the distal end portion 162 of the cross pin 90 is shown stepped down from the intermediate shank portion 158, the cross pin may comprise a uniform outer diameter. For example, an alternate pinion gear arrangement may be employed with a differential assembly providing enough space to accommodate a cross pin defining a consistent outer diameter.

Figure 7:
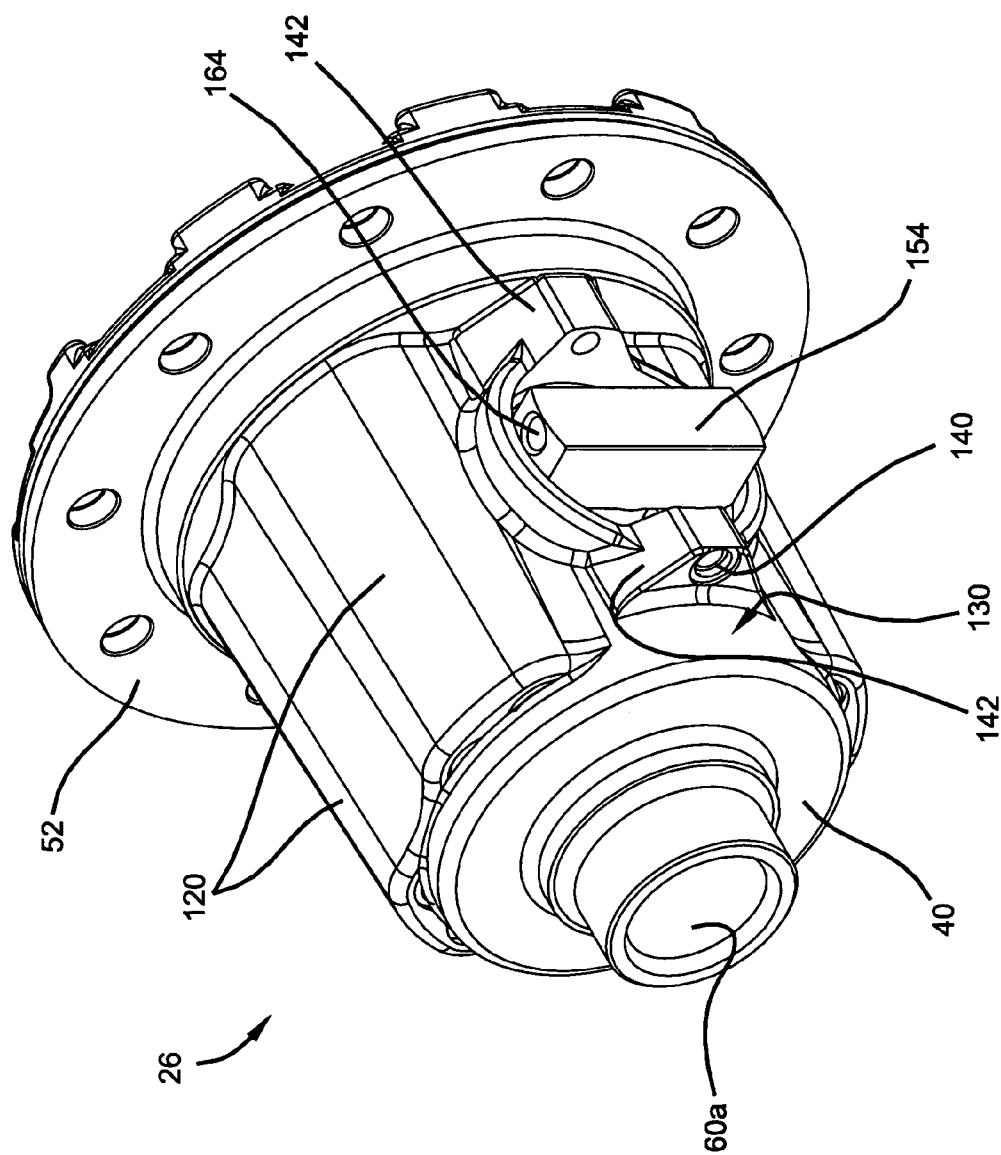
FIG. 7 is a perspective view of the differential assembly of FIG. 1 illustrating the cross pin assembly engaged to the cylindrical boss of the differential casing.

With reference to FIGS. 4 and 7, assembly of the cross pin assembly 90 into the differential casing 40 will now be described in greater detail. Once the C-clips 94 are properly located and the spacer 86 is located between the side gears 66a and 66b, the spacer passage 92 may be aligned opposite the window opening 124 on the differential casing 40. The distal end 162 and the intermediate portion 158 of the cross pin assembly 90 are inserted through the window opening 124 and the spacer passage 92. The distal end 162 of the cross pin assembly 90 may be located into the bore 172 on the differential case 40 opposite the window opening 124. The bore 172 and the bore 136 pilots the cross pin assembly 90 during installation. The proximal head portion 154 may be inserted in an orientation substantially transverse to the axis of the differential casing 40. In this way, the head portion 154 of the cross pin assembly 90 will not interfere with the adjacent ring gear 38 (FIG. 1) during installation.

Figure 8:
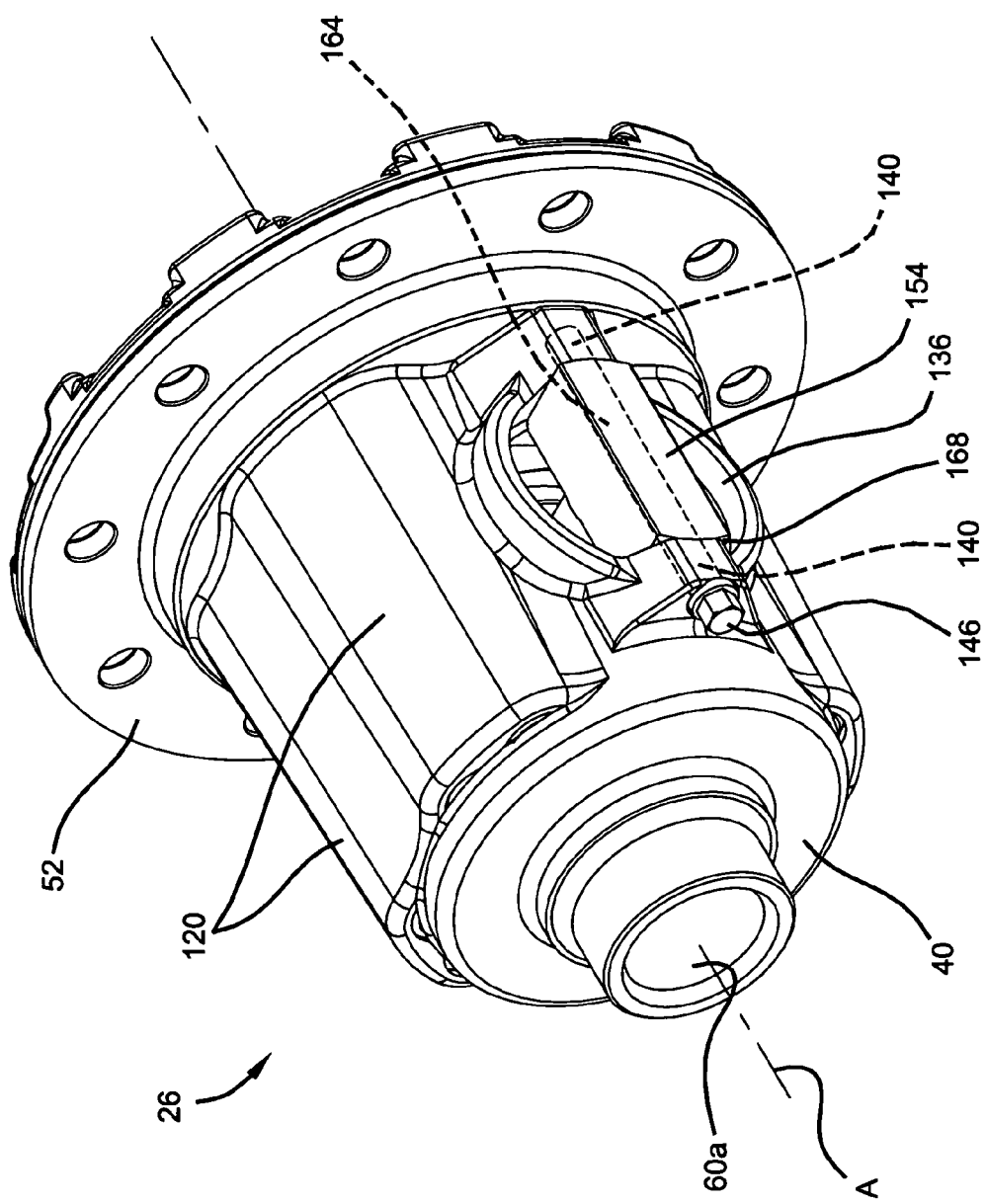
FIG. 8 is a perspective view of the differential assembly of FIG. 1 illustrating the cross pin assembly in an installed condition.

As the distal end 162 of the cross pin assembly 90 locates into the bore 172, the bottom surface 170 of the head portion 154 engages the ledge 150 between the counterbore 132 and the window opening 124. Similarly, the arcuate ends 168 of the proximal head 154 engage the inner radial engaging surface 136 of the counterbore 132. The proximal head portion 154 may then be rotated from the position shown in FIG. 7 into a substantially parallel orientation with the axis A of the differential 26 as illustrated in FIG. 8 until the throughbore 164 aligns with the mounting passages 140 of the raised flanges 142 on the cylindrical boss 128. During rotation of the proximal head portion 154, the inner radial engaging surface 136 pilots the arcuate ends 168 of the proximal head portion 154. Concurrently, the ledge 150 maintains the cross pin assembly 90 at the proper depth and assures that the throughbore 164 will be properly aligned with the mounting passages 140 of the raised flanges 142 on the cylindrical boss 128.

With the throughbore 164 and the mounting passages 140 aligned to one another, the fastener 146 may be inserted and secured. With the cross pin assembly 90 thus installed, relative movement between the cross pin assembly 90 and the differential casing 40 is essentially inhibited. As a result, the endplay of the axle shafts 44 and 46 (FIG. 1) may be controlled within desirable tolerances as a function of the diameter of the intermediate portion 158 of the cross pin 90. The spacer 86 is disposed between the sidegears 68a and 68b and controls axial endplay of the sidegears 68a and 68b to keep the differential 26 from binding. The cross pin 90 does not touch the spacer 86 in an assembled condition. The passage 92 in the spacer 86 defines a greater diameter than the diameter of the cross pin 90. In this way, two distinct components are used to control the side gear endplay (namely, the spacer 86), and the axle shaft endplay (namely, the cross pin 90). Such an arrangement allows for a desired amount of side gear endplay without affecting the axle shaft endplay.

The mass of the differential assembly 26 may be distributed to provide rotational balance. Specifically, the mass of the cylindrical boss 128 and the cross pin head 154 cooperate with the mass of the differential casing 40 around the pinion bores 110–116 and the mass of the pinion gears 100–106 to provide a rotationally balanced differential assembly 26. Stated another way, the mass of the several components of the differential assembly 26 are distributed about the rotational axis A so as to minimize or eliminate imbalance when the differential assembly 26 is rotated about the rotational axis A. It is appreciated that a counter weight may additionally, or alternatively be incorporated onto the differential casing 40 or the end cap 50 of the differential assembly 26.

The fastener 146 may be configured the same as an open differential such that the same axle assembly lines may be ran with both open differentials and helical gear differentials without changing tooling or torque wrench settings.

Figure 9:
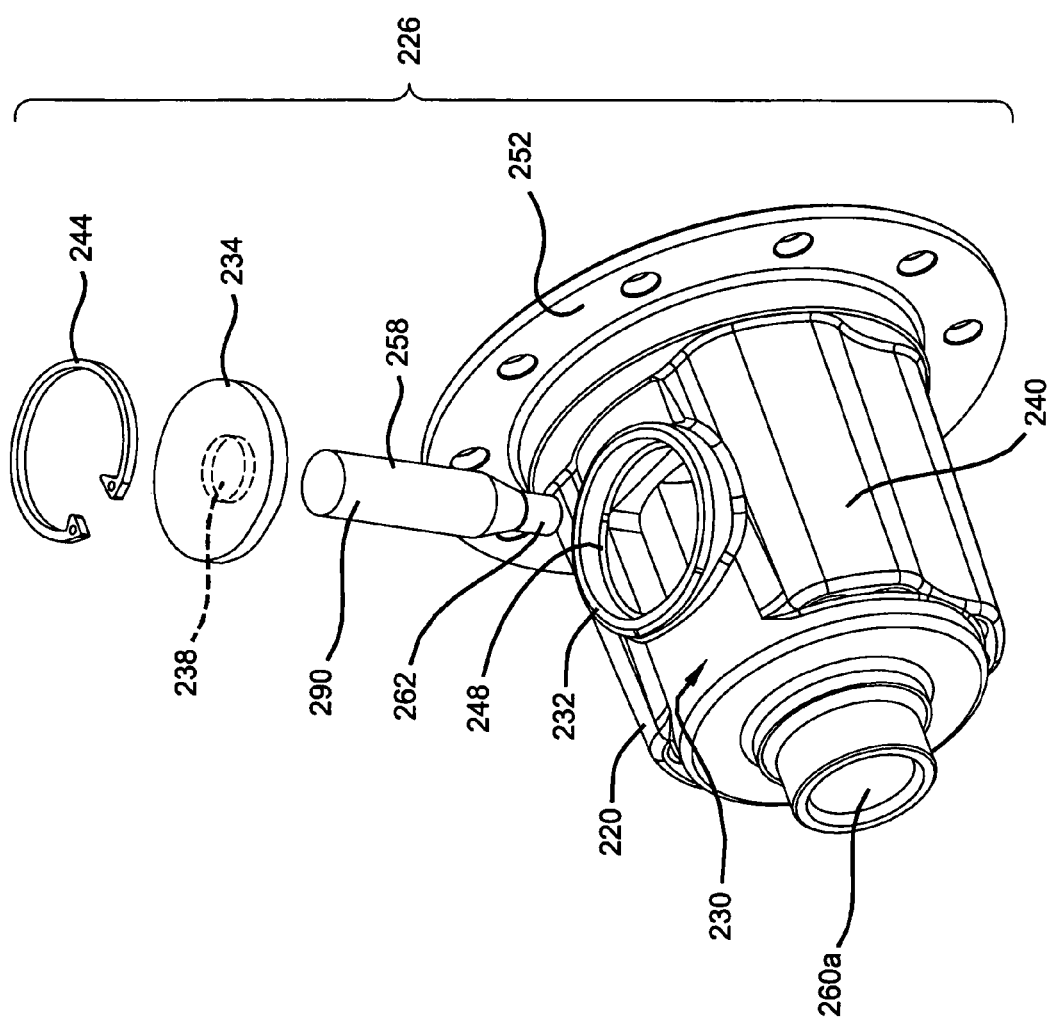
FIG. 9 is an exploded view of a differential assembly according to other features.
Figure 10:
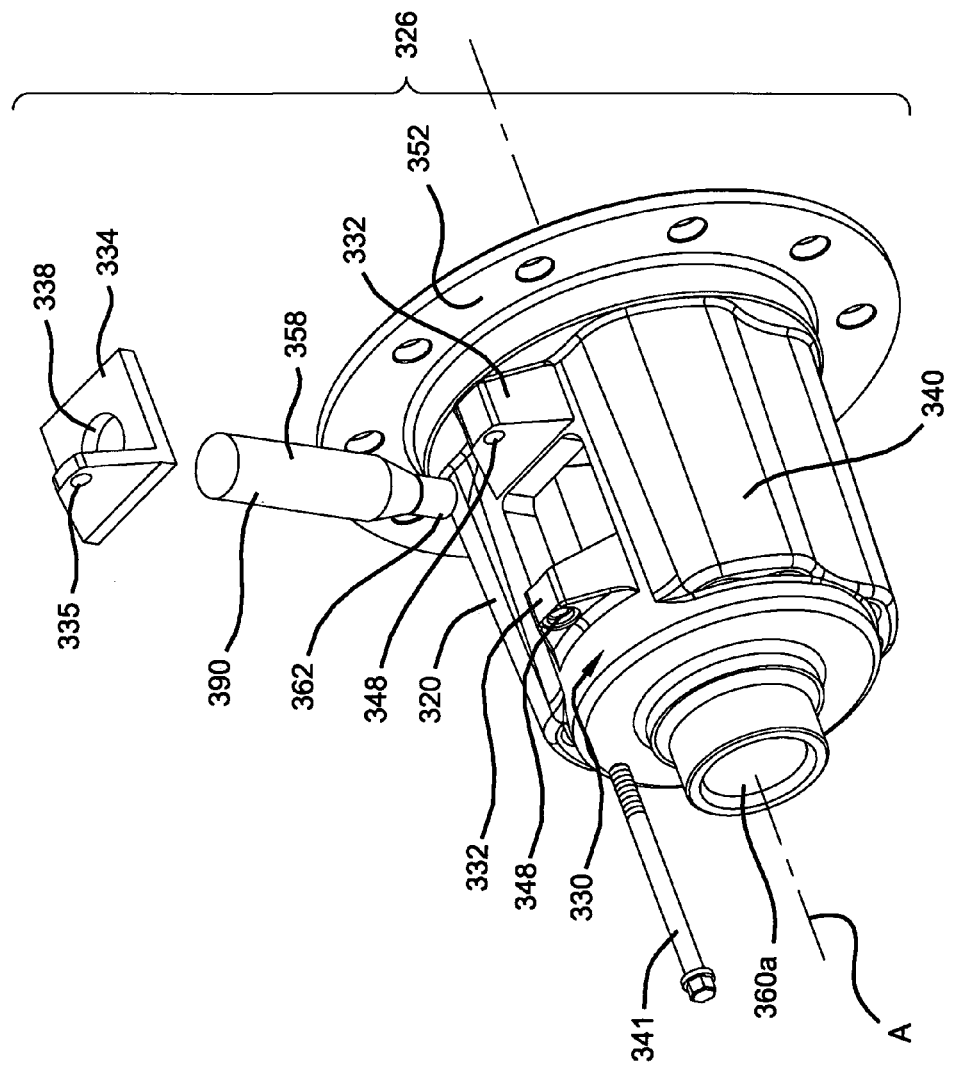
FIG. 10 is an exploded view of a differential assembly according to other features.
Figure 11:
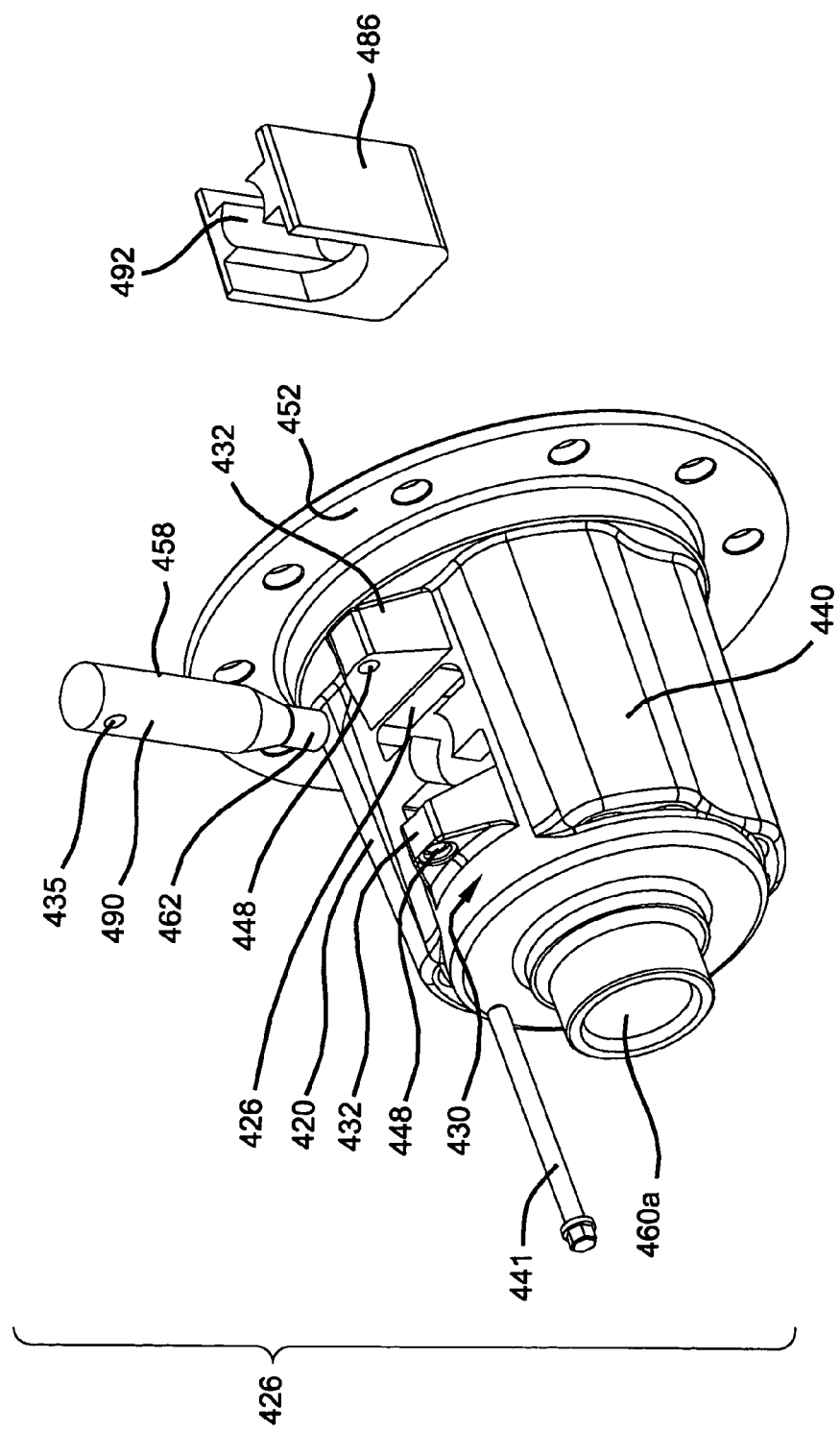
FIG. 11 is an exploded view of the differential assembly according to other features.

Turning now to FIG. 9, a differential assembly 226 according to other features is shown. The differential assembly 226 incorporates like components as the differential assembly 26 and are identified with a 200 prefix. The differential assembly 226 includes a cross pin 290 having an intermediate shank portion 258 and a distal end portion 262. The cross pin 290 may be adapted to be retained in the differential case 240 by a retaining disk 234. Specifically, the proximal end of the cross pin 290 may be adapted to recess into a counterbore 238 formed on an inboard surface of the retaining disk 234. A retaining ring 244 may be adapted to seat into a radial lip 248 arranged on the counterbore 232 in an assembled position.

with reference now to FIG. 10, a differential assembly 326 according to additional features is show. The differential assembly 326 incorporates like components as the differential assembly 26 and are identified with a 300 prefix. The differential assembly 326 includes a cross pin 390 having an intermediate shank portion 358 and a distal end portion 362. The cross pin 390 may be adapted to be retained in the differential case 340 by an L-plate 334 and a fastener 341. Specifically, a proximal end of the cross pin 390 may be adapted to pass through an opening 338 arranged on the L-plate 334. In this way, the L-plate cooperates with the cross pin 390 to maintain the cross pin 390 in a substantially perpendicular orientation with axis A. The fastener 341 may be adapted to be secured through passages 348 incorporated in flange portions 332 and a passage 335 arranged in the L-plate 334. As a result, in an installed position, the fastener 341 bounds the proximal end of the cross pin 290 and maintains the cross pin 290 in an installed position.

with reference now to FIG. 11, a differential assembly 426 according to additional features is shown. The differetial assembly 426 incomportes like components as the differential assembly 26 and are identified with a 400 prefix. The differential assembly 426 includes a cross pin 490 having an intermediates shank portion 458 and a distal end portion 462. The cross pin 490 may be adapted to be retained in the differential casing 440 by a fastener 441. Spicifially, the fastener 441 may be adapted to be secured through passages 448 incorporated in flangs portions 432 and a passage 435 arranged in the cross pin 490.

An access passage 426 may be incorporated in the differential casing 440 and defines an access for installing C-clips 92 (FIG. 3). A spacer 486 according to additional features includes a passage 492 for accepting the cross pin 490 therethrough in an assembled position. The spacer 486 may be adapted to be installed into the differential casing 440 axially and be positioned between side gears as described herein.

While the invention has been described in the specification and illustrated in the drawings with reference to various embodiments, it will be understood by those skilled in the art that various changes may be made and equivalents may be substituted for elements thereof without departing from the scope of the invention as defined in the claims. Furthermore, the mixing and matching of features, elements and/or functions between various embodiments is expressly contemplated herein so that one of ordinary skill in the art would appreciate from this disclosure that features, elements and/or functions of one embodiment may be incorporated into another embodiment as appropriate, unless described otherwise, above. Moreover, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. A differential assembly for a vehicle comprising:
  a differential casing rotatable about an axis, said differential casing defining first, second, third and fourth pairs of pinion bores;
  a pair of side gears disposed within said differential casing;
  first, second, third and fourth pairs of pinion gears slidably and rotatably disposed in said first, second, third and fourth pair of pinion bores, respectively;
  a window opening formed in said differential casing between said first pair of pinon gears and said fourth pair of pinion gears;
  a spacer received through said window opening, the spacer being disposed between said side gears, said spacer defining an aperture;
  a cross pin extending generally perpendicular to said axis from said window opening and into said differential casing, said cross pin being coupled to the differential casing and passing throuah said aperture in said spacer to thereby fix said spacer to said differential casing;
  wherein said second pair of pinion bores is circumferentially offset from said first pair of pinion bores by a first spacing angle, said third pair of pinion bores is circumferentially offset from said second pair of pinion bores by a second spacing angle, said fourth pair of pinion bores is circumferentially offset from said third pair of pinion bores by a third spacing angle and said fourth pair of pinion bores is circumferentially offset from said first pair of pinion bores by a fourth spacing angle, wherein the first spacing angle is about equal to the seond spacing angle, the third spacing angle is about equal to at least one of the first spacing angle and the second spacing angle, and the fourth spacing angle is greater than the first spacing angle.

2. The differential assembly of claim 1 wherein said cross pin includes a proximal head portion, which is secured to said differential casing proximate said window opening, an intermediate shank portion, which passes through said aperture in said spacer, and a distal end portion that is piloted in a pin bore formed in the differential casing.

3. The differential assembly of claim 2 wherein said window opening includes an access passage surrounded by a boss that extends from an outer surface of said differential casing, wherein said proximal head portion of said cross pin is received by said boss.

4. The differential assembly of claim 3 wherein said boss includes at least one mounting passage formed thereon for receiving a fastener therethrough, said fastener extending through said head portion of said cross pin.

5. The differential assembly of claim 4 wherein a mass of said boss and said cross pin head cooperate with a mass of said differential casing around said first, second, third and fourth pairs of pinion bores and a mass of said respective pinion gears to rotationally balance the differential assembly about the axis.

6. A differential assembly for a vehicle comprising:
  a differential casing rotatable about an axis,
  a pair of side gears disposed within said differential casing,
  a first, second, third and fourth pair of pinion bores formed in said differential casing;
  a first, second, third and fourth pair of pinion gears slidably and rotatably disposed in said first, second, third and fourth pair of pinion bores, respectively;
  a window opening formed in said differential casing between said first and fourth pair of pinion gears; and
  a cross pin extending substantially transverse to said axis and through a passage in a spacer;
  wherein said second pair of pinion bores are radially offset an eguivalent distance from said first and third pair of pinion bores, and wherein said third pair of pinion bores are radially offset an eguivalent distance from said second and fourth pair of pinion bores;
  wherein said spacer is disposed between said pair of side gears in said differential casing;
  wherein said cross pin includes a proximal head portion, which is secured to said differential casing proximate said window opening, an intermediate shank portion, which passes through said passage in said spacer, and a distal end portion that is piloted in a bore formed in the differential casing; and
  wherein said distal end portion is stepped down from said intermediate shank portion.

7. A differential assembly for a vehicle comprising:
  a differential casing rotatable about an axis and communicating with a first and second axle shaft;
  a window opening formed in said differential casing;
  a pair of side gears disposed within said differential casing;
  a spacer disposed between said pair of side gears and limiting inward movement of said side gears, said spacer having a passage therein; and
  a cross pin extending generally transverse to said axis and through said differential casing, said cross pin passing through said passage in said spacer, said cross pin limiting inward movement of said first and second axle shafts;
  wherein said cross pin limits inward movement of said first and second axle shafts independently of said spacer limiting inward movement of said side gears;
  wherein said cross pin includes a proximal head portion secured to said differential casing at said window opening;
  wherein said window opening includes an access passage surrounded by a boss extending on an outer surface of said differential casing, said proximal head portion received by said boss in an installed position;
  wherein said boss includes at least one mounting passage formed thereon for receiving a fastener therethrough, said fastener restraining said cross pin in said installed position;
  wherein said cross pin is rotatable between an installation orientation wherein a longitudinal body of said proximal head portion is substantially transverse to said axis and an installed orientation whereby said longitudinal body is substantially parallel to said axis; and wherein said longitudinal body of said cross pin includes arcuate ends for slidably engaging an arcuate surface of said boss during rotation between said installation orientation and said installed orientation.

8. The differential assembly of claim 7 wherein a ledge portion extends between said window opening and said boss on said differential casing, said longitudinal body bounded on an inboard surface by said ledge portion in said installed position.

* * * * *